May 12, 1970　　　　H. LINDEBOOM　　　　3,511,510
HIGH PRESSURE FLUID SEAL WITH BIASING ACTION
Filed March 22, 1965　　　　　　　　　　3 Sheets-Sheet 2
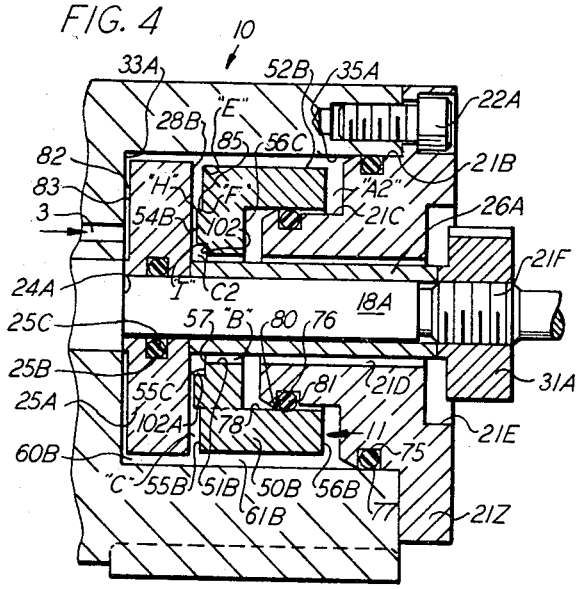
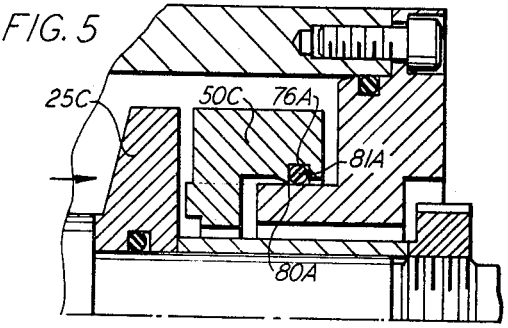
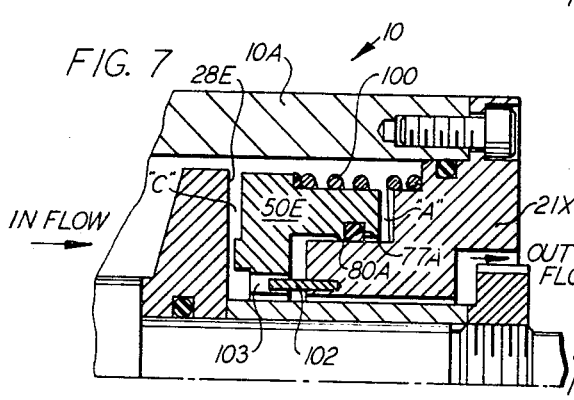
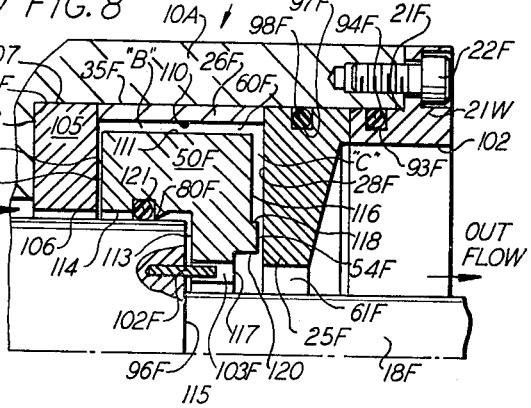
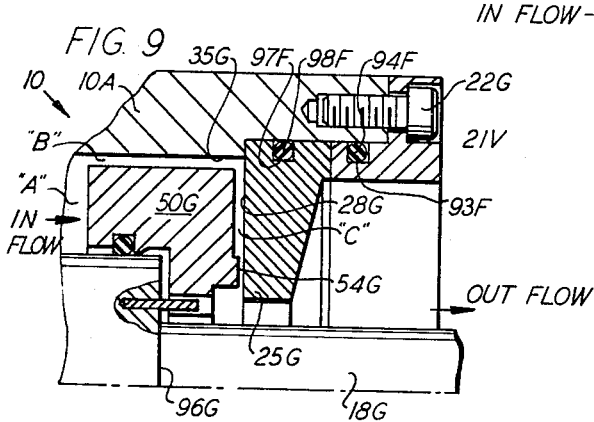
INVENTOR.
HERMAN LINDEBOOM
BY
William Frederick Werner
ATTORNEY

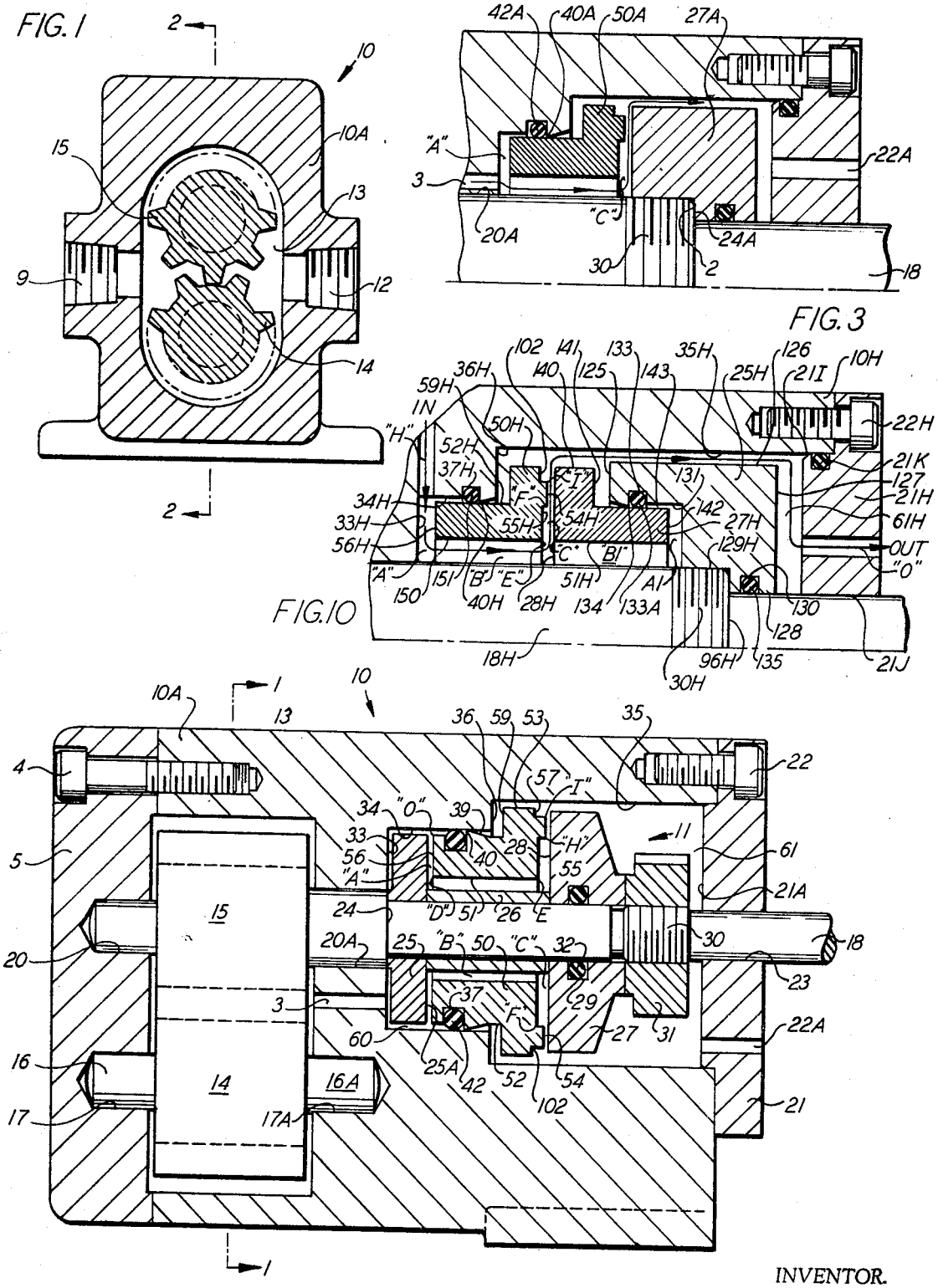

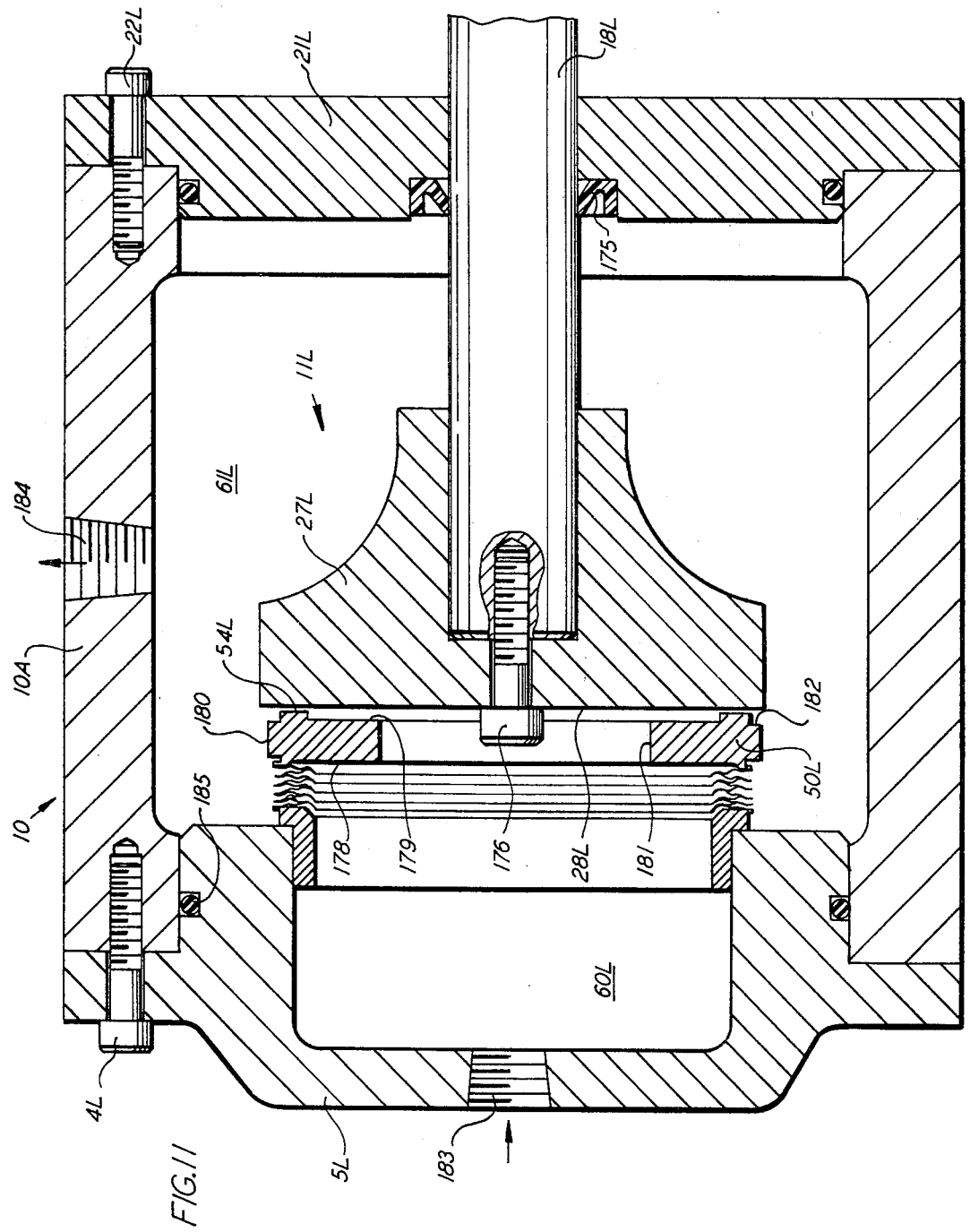

United States Patent Office 3,511,510
Patented May 12, 1970

3,511,510
HIGH PRESSURE FLUID SEAL WITH
BIASING ACTION
Herman Lindeboom, Warwick, R.I., assignor to Sealol,
Inc., Warwick, R.I., a corporation of Delaware
Continuation-in-part of application Ser. No. 369,718,
May 25, 1964. This application Mar. 22, 1965, Ser.
No. 441,507
The portion of the term of the patent subsequent
to Feb. 17, 1987, has been disclaimed
Int. Cl. F16j 15/34, 15/54
U.S. Cl. 277—27
2 Claims

ABSTRACT OF THE DISCLOSURE

This invention relates to high pressure fluid seals employing a fluid pressure responsive sealing ring arranged to move axially along a rotating shaft and relative to a mating ring fixed to the shaft to establish a fluid seal under conditions which permit controlled leakage past the interfaces of the mating ring face and sealing ring face.

---

The present invention is a continuation-in-part of my co-pending application Ser. No. 369,718, filed May 25, 1964 for a High Pressure Fluid Seal With Controlled Leakage.

This invention relates to high pressure fluid seals and more particularly to fluid seals in which the fluid pressure assists in the physical location of the sealing ring in relation to the sealing face.

This invention is concerned with a rotary mechanical seal of the kind used for effecting a seal against the controlled passage of fluid between relatively rotatable parts, as for example between a rotating sealing ring or piston and a stationary sealing face. The type of seal with which this invention is particularly concerned is that in which a ring-like seal face is resiliently pressed in an axial direction against a radially extending stationary face.

A known hydraulic principal frequently employed in fluid seals is to vary the area on oppoiste ends of a tube-like sealing ring, whereby the fluid pressure acting upon the surface of greatest area moves the sealing ring in a direction of the end having the smallest area with a force equal to the force of the fluid pressure multiplied by the difference in area between the greatest area and the smallest area.

Fluid seals adapted to accommodate high fluid pressures rapidly wear out and leak because the sealing ring engages the sealing face with a pressure which induces rapid wear between the relatively rotating parts.

Recognizing the foregoing, workers in the art have attempted in various ways to effect a satisfactory high pressure fluid seal having a degree of leakage between the relatively rotating parts. Fluid seals providing for controlled leakage have been proposed which require auxiliary pumping arrangements and/or orifices or grooves have been provided across one or both of the faces of the sealing face and sealing ring in order to permit controlled leakage past the sealing interface. This approach presents costly auxiliary apparatus in the form of pumps or similar apparatus and complexities of manufacture and operation which the co-opending application and the present invention obviate.

Applicant has discovered the unobvious concept, structure, function and result of providing exceedingly narrow passageways in the nature of one ten-thousandth of an inch (.0001) between opposite ends of the sealing ring and adjacent surfaces whereby a pressure drop is realized across the end surfaces and a static sealing ring is converted into a dynamic sealing ring whereby metered fluid leakage is provided and controlled between the sealing interfaces.

It is therefore an object of the present invention to provide a high pressure fluid seal which employs a fluid pressure responsive sealing ring arranged to move relative to a fixed sealing face to establish a fluid seal under conditions wherein the full force of the fluid pressure acting upon the sealing ring is materially reduced and the sealing ring provides controlled leakage between the sealing interfaces while the sealing ring is converted from a static to a dynamic sealing element.

Another object of the present invention is to provide a fluid seal for use between relatively rotating sealing interfaces which operate under conditions of extremely high pressure, high speeds, and high temperatures while eliminating inordinate wear on the sealing interfaces.

Other objects of the present invention will become apparent in part and be pointed out in part in the following specification and claims.

Like reference numerals refer to like parts in the accompanying drawings in which:

FIG. 1 is a transverse vertical cross sectional view taken on line 1—1 of FIG. 2 illustrating a typical pump incorporating the fluid seal of the present invention.

FIG. 2 is a longitudinal cross sectional view taken on line 2—2 of FIG. 1, showing two restricted passageways on opposite ends of the sealing ring; the seal being internally pressurized.

FIG. 3 is a longitudinal fragmentary cross sectional view similar to FIG. 2, showing a fluid seal provided with one unrestricted passageway and one restricted passageway: the seal being internally pressurized.

FIG. 4 is a longitudinal fragmentary cross sectional view showing a fluid seal operating under conditions reverse to that in FIG. 3; the sealing face operates in a direction opposite to that in FIG. 3; the pressure is external to the sealing face and one restricted and one unrestricted passageway is provided.

FIG. 5 is a modified form of structure shown in FIG. 4 with the O ring and knife edge located in the sealing ring in place of the housing flange. It also illustrates that the sealing face shoulder and the gland surface of the housing flange are located in the same horizontal plane.

FIG. 6 is a modified form of structure shown in FIG. 5; employing a bellows as both a fluid sealing element and a pressure responsive element.

FIG. 7 is a view similar to FIG. 5; employing a coil spring as a pre-loading, seal face, pressure responsive element.

FIG. 8 is a modified form of structure shown in FIG. 2 wherein the sealing ring is connected to rotate with the shaft instead of being held in the housing by means of an O ring and knife edge; and with the members which provides the restrictive passageways located in the housing instead of on the shaft.

FIG. 9 is a view similar to FIG. 8, showing one restricted and one unrestricted passageway instead of two restricted passageways.

FIG. 10 is a modified form of fluid seal wherein both the sealing ring and mating ring are fluid pressure responsive.

FIG. 11 is still another modified form of fluid seal wherein the mating ring is fastened to rotate with the shaft and the sealing ring is supported by and is actuated by an expansible bellows.

Reference is first made to FIGS. 1 and 2 for a brief explanation of the pump and pump housing which provide a fluid pressure chamber wherein the fluid seal of the present invention finds an operational environment.

A housing, generally indicated by reference numberal 10 is provided, consisting of a medial unit 10A having a hollow interior, generally indicated by reference numeral 11. A flange 21 provided with a bearing 23, is fastened to medial unit 10A by means of bolts 22. Flange 21 closes one end of hollow interior 11. An end plate 5 provided with bearings 17 and 20 and fastened to medial unit 10A by means of bolts 4, closes the other end of hollow interior 11. In order to more easily understand the present invention, hollow interior 11 will be refered to hereinafter, sectionally. An inlet port 9 and a discharge port 12 communicate with a gear box portion 13 of hollow interior 11. A gear 14 located in gear box 13 is fastened to a short shaft having oppositely projecting ends 16, 16A which are rotatively mounted in bearings 17, 17A, respectively. Bearing 17A is located in medial unit 10A.

A gear 15 located in gear box 13 and in engagement with gear 14 is fastened to a drive shaft 18 mounted in bearings 20, 20A and 23. Bearing 20A is located in medial unit 10A. Shaft 18 projects beyond the confines of housing 10 so as to be connected to a suitable source of power, such as an electric motor (not shown), which serves to rotate shaft 18 and gears 14, 15 which function as a pump.

Shaft 18 is provided with a shoulder 24. A disk 25 is positioned upon shaft 18 with a drive fit abutting shoulder 24. A collar 26 is located upon shaft 18 with a drive fit abutting disk 25. A fixed mating ring 27 provided with a mating face 28 and a circular groove 29 is located upon shaft 18 with a forced fit. Shaft 18 is provided with a threaded area 30. A thrust nut 31 is rotatively mounted upon threaded area 30 abutting fixed mating ring 27. Thrust nut 31 forces fixed mating ring 27 against the end of collar 26. An O ring or other fluid packing 32 is located in circular groove 29 to provide a fluid tight seal around shaft 18.

The fluid pressure chamber wherein the fluid seal operates is a part of hollow interior 11 and comprises an abutment 33, a circular wall 34, an internal surface 35 and a circular projection 36. An end wall 21A on flange 21 forms the end of the chamber opposite abutment 33. Fluid may enter this chamber by means of the space between shaft 18 and bearing 20A and exit the chamber via the space between shaft 18 and bearing 23. Obviously the fluid may enter and leave via the same two spaces but in an opposite direction. The direction of entrance of the fluid into the chamber is important because the fluid enters under pressure and the fluid pressure acts to influence the operation of the sealing ring. It is to be noted that any chamber in which fluid under pressure enters and exits is an environment for the present invention.

A pressure responsive sealing ring 50, generally of tubular configuration to surround shaft 18 and collar 26, is provided with a circular inner surface 51, a circular outer surface 52, a circular projection 53, a circular sealing face 54, a front pressure surface 55, a rear pressure surface 56, a circular rim 57 and a circular shoulder 59.

Sealing ring 50 is supported by a line contact through the engagement of circular outer surface 52 with circular knife edge 40. This line contact support serves advantageously to minimize the frictional drag between sealing ring 50 and circular knife edge 40 as sealing ring 50 is slid axially of shaft 18. Moreover, sealing ring 50 is thereby afforded a limited range of rocking movement which is advantageous in maintaining parallelism between circular sealing face 54 and mating face 28. In this manner circular sealing face 54 is self-adjusting and self-aligning with mating face 28.

Circular outer surface 52 is provided with a circular recess 37 and a circumferential rib 38 which is tapered at 39 to provide a circular knife edge 40. A packing 42 which may take the form of an O ring is located in circular recess 37 and engages circular wall 34 to provide a fluid tight seal dividing hollow interior 11 into a cavity 60 and a compartment 61. Sealing ring 50 is axially slidable between mating face 28 and surface 25A to control the passage of fluid there between.

With continued reference to FIGS. 1 and 2; fluid in cavity 60 may flow into space "A" formed between the surface 25A and rear pressure surface 56 and into space "B" formed between circular inner surface 51 and the outside surface of collar 26. The fluid will then flow into space "C" formed between mating face 28 and front pressure surface 55.

In the prior art spaces A, B and C were approximately equal in width to provide for the free flow of fluid up to sealing face 54 where a fluid tight seal was effected.

Sealing face 54 engaged mating face 28 with the resultant of a force equal to the force of the fluid pressure times the area of rear pressure surface 56, minus the force of the fluid pressure times the area of front pressure surface 55. The width of sealing face 54 was increased or decreased to subtract or add to the area of front pressure surface 55 to thereby vary the difference in area between rear pressure surface 56 and front pressure surface 55 while the fluid pressure remained the same. Sealing ring 50 moved axially in the direction dictated by the surface 55 or 56 of greatest area which normally was rear pressure surface 56 which forced sealing face 54 into fluid tight sealing engagement with mating face 28. This condition caused undue wear and undesirable friction on sealing face 54 and mating face 28. It is a principal object of the present invention to overcome this condition of wear and friction.

It has been discovered to reduce the width of space "A" to a dimension of approximately nine hundred micro-inches (.0009) so as to create an extremely narrow or restrictive passageway "A"; the fluid pressure will drop between point "O" and point "D" across rear pressure surface 56. The resultant of fluid pressure acting upon rear pressure surface 56 is one half the total of the sum of the pressures at point "O" and at point "D." In this manner the force of the fluid acting upon rear pressure surface 56 is materially reduced over the force of the fluid acting upon rear pressure surface 56 where there is an unrestricted flow of fluid through passageway "A." This fact is very important when fluid pressure in the nature of ten thousand pounds per square inch is encountered. This reduction in fluid pressure, through the use of a restricted passageway "A" is also important in controlling the difference in pressure between the fluid pressure acting on rear pressure surface 56 and front pressure surface 55.

The present structural concept requires that space "C" be reduced to a width of two hundred micro-inches (.0002) to provide a cooperating restrictive passageway opposite to restrictive passageway "A." There will be a pressure drop between points "E" and "F" so that the resultant of fluid pressure acting upon front pressure surface 55 is one-half the total of the sum of the pressures at point "E" plus point "F."

Unrestricted passageways "A," "B" and "C" provide a static seal. That is fluid pressure forces the piston 50 in the direction of the surface having the smallest area, thereby engaging the sealing surface 54 of the piston 50 with the mating face 28 to create a fluid tight seal.

The present structure contemplates a dynamic seal which is created by providing a controlled or metered fluid leakage between sealing surface 54 and mating face 28. It is structurally desirable to have circular sealing face 54 separated from mating face 28 by approximately one hundred micro-inches (.0001), a distance equal to the thickness of a film of oil. The surface tension or viscosity of the fluid provides a dampening effect upon piston 50 through circular sealing face 54 and mating face 28.

In the present structure space "B" is an unrestricted passageway for the fluid flowing from restricted passageway "A" to restricted passageway "C."

A sealing element constructed in accordance with the foregoing principles will provide a piston 50 upon which the fluid pressure balances the forces acting upon opposite pressure faces 55, 56 to effect physical separation of mating face 28 from circular sealing face 54.

In operation, it can be assumed that a fluid is flowing into chamber 13 through inlet port 9 and that shaft 18 is being rotated from its power source as earlier related. In consequence thereof the fluid is impelled out of outlet port 12 under relatively high pressure as already set forth. It will be readily appreciated that with fluid under a high static pressure within chamber 13, the fluid will leak past the clearances of the various parts of the pump and it is in this manner that leakage can occur in the illustrated pump. Thus, this fluid under high pressure will travel from chamber 13, through bearing 20A and into fluid cavity 60 due to clearance between bearing 20A and shaft 18. This flow along shaft 18 to fluid cavity 60 is not deleterious to the operation of the pump so long as this flow does not continue outwardly into the atmosphere. It is this excessive leakage which the fluid seal of the present invention advantageously restricts.

As the fluid under its relatively high system pressure enters fluid cavity 60, as just stated, it flows into and through restrictive passageway "A" from point "O" to point "D" encountering a pressure drop on the way between points "O" and "D" when the fluid has flow. That is dynamic pressure as opposed to static pressure.

The fluid will exert an axial force, equal to the resultant of pressure, or mean pressure, between points "O" and "D," against the area of rear pressure surface 56 to urge piston 50 and circular sealing face 54 towards sealing face 28.

The fluid will flow from restrictive passageway "A" into unrestrictive passageway "B" with a negligible pressure drop between points "D" and "E." The fluid pressure in passageway or space "B" does not influence the axial position of piston 50.

The fluid will then flow from passageway "B" into and through restrictible passageway "C" from point "E" to point "F" encountering a pressure drop on the way when the fluid has flow.

The fluid will exert an axial force equal to the resultant of pressure, or mean pressure, between points "E" and "F," against the area of front pressure surface 55 to urge piston 50 and circular mating face 54 away from mating face 28.

The fluid will then flow in droplets across circular sealing face 54 from point "H" to point "I." There is a negligible pressure drop between points "F" and "H." The fluid will exert an axial force equal to the resultant of pressure or mean pressure between points "H" and "I" against the area of circular sealing face 54 to urge piston 50 and circular sealing face 54 away from mating face 28.

The fluid will flow from point "I" into compartment 61 where the fluid pressure is less than the fluid pressure in cavity 60. The fluid pressure in compartment 61 is normally substantially equal upon circular rim 57, on the surface of circular projection 53, on the surface of circular shoulder 59, surface 102, and circular outer surface 52 between knife edge 40 and circular shoulder 59.

The fluid pressure acting upon surfaces 102, 53 and 52 does not influence the axial position of piston 50. The fluid pressure acting upon circular rim 57 will be opposed by the fluid pressure acting upon surface 59 and will provide a force influencing the axial movement of piston 50 toward mating face 28. This force is readily calculable.

The present invention determines the axial position of piston 50 in relation to disk 25 and mating face 28. As soon as the forces acting opposite to each other are in the desired ratio of unbalance, the fluid pressure will axially locate piston 50 to permit controlled or metered leakage of the fluid between circular sealing face 54 and mating face 28 to provide the necessary flow to sustain a dynamic seal.

Passageway "A" should be greater in width than passageway "C" but both must provide a restrictive passageway to insure a fluid pressure drop on the fluid as it flows through the passageway. Space B is unrestricted and should be greater in width than passageway "A." The wider the passageway the less the restriction and the lower the pressure drop. In the example given, the greater pressure drop and therefore the greater restriction is desired in passageway "C" as between spaces "A, B and C." The difference in pressure drops and therefore the difference in width between passageways "A" and "C" is determined by the summation of forces acting upon the areas of rear pressure surface 56 plus surface 59 and minus the sum of the areas of front pressure surface 55, circular sealing face 54 and circular rim 57.

The areas herein mentioned can be fixed or determined and therefore it is a mere matter of mathematics to calculate the areas of the respective components in relationship to the fluid pressure operating in the unit to determine the proportioning necessary to maintain a predetermined fluid thickness between circulating sealing face 54 and mating face 28.

It will be evident that a slight leakage of fluid will occur. The fluid so emitted into compartment 61 will readily be drained off and through the drain compartment 61 which is vented to the atmosphere. In FIG. 2, the fluid may drain off through the space between shaft 18 and bearing 23 or a drain orifice 22A may be provided in flange 21. In like manner a port 3 may be provided in medial area 10A or the fluid may flow between shaft 18 and bearing 20A from gear box portion 13 to cavity 60.

FIG. 2 illustrates a construction with the knife edge 40 and the fluid packing 42 located in sealing ring 50. Passageways "A" and "C" are deemed to be restrictive.

FIG. 3 illustrates a modified form of construction wherein passageway "A" is unrestricted and passageway "C" is restricted. Fixed mating ring 27A is rotatively mounted upon threaded area 30 and is provided with a circular abutment 2 which engages a shoulder 24A on shaft 18. Fluid under pressure enters cavity 60 through port 3 and/or from between shaft 18 and bearing 20A. The fluid packing 42A and knife edge 40A may be located in medial area 10A as shown in FIG. 3 or in sealing ring 50 as shown in FIG. 2. Sealing ring 50A is substantially the same as sealing ring 50.

FIG. 4 illustrates a modified form or construction of fluid seal when compared with FIG. 2. Housing 10, consisting of medial unit 10A, having a hollow interior, generally indicated by reference numeral 11, is provided with a port 3, an abutment 33A and an internal surface 35A. To this extent the construction of FIGS. 2 and 4 are identical.

A flange 21Z is provided with an external shoulder 21B, a circular projection 21C and with an axial passageway 21D having a counterbore 21E. Shoulder 21B is provided with a packing recess 75. Circular projection 21C is provided with a packing recess 76. Bolts 22A fasten flange 21Z to medial area 10A with external shoulder 21B engaging internal surface 35A a packing 77 in recess 75 provides a fluid tight seal. A shaft 18A rotatively mounted in medial unit 10A is provided with a threaded area 21F. A disk 25A provided with a circular recess 25B is fastened to shaft 18A with a drive fit abutting shoulder 24A. A packing, shown as an O ring 25C is located in circular recess 25B and embraces shaft 18A in fluid tight relationship. A collar 26A is located upon shaft 18A and is held in position against disk 25A by thrust nut 31A rotatively mounted upon threaded area 21F.

Pressure responsive sealing ring 50B consists of a circular outer surface 22B, an upper rear pressure surface 56B, a lower rear pressure surface 56C, an inner surface 51B, an upper, front pressure surface 55B, a lower front pressure surface 55C, a sealing face 54B and a sliding surface 78.

Circular projection 21C is provided with a knife edge 80. Sliding surface 78 is slidably mounted upon knife edge 80 which provides a degree of tilting motion to sealing ring 50B. A fluid packing, such as an O ring 81 is located in packing recess 76 and forms a fluid tight seal between circular projection 21C and sliding surface 78.

Disk 25A rotates with shaft 18A while pressure responsive sealing ring 50B is generally non-rotatable. Passageway A is illustrated as a non-restrictive passageway but obviously it could be a restrictive passageway. Passageway C is a restrictive passageways. Passageways C2 and A2 are non-restricted.

In operation, it is assumed that fluid under pressure is flowing in the direction of the arrow through port 3 into cavity 60B and that shaft 18A is being rotated from a power source as previously described. The fluid will flow into and through passageway 82 formed between abutment 33A and the side 83 of disk 25A which is a part of cavity 60B, into restrictive passageway C and non-restrictive passageway A2. O ring 81 will seal off the flow of fluid passed O ring 81 and out of cavity 60B. Sealing surface 54B engaging mating face 28B will permit a metered flow of fluid passed this couple or intersection as will presently appear. The fluid acting upon circular outer surface 52B, inner surface 51B, sliding surface 78, and surfaces 85 and 102A will have an effect upon the sliding movement of sealing ring 50B upon knife edge 80. A dot and dash line indicates that surface 85 may be opposite sliding surface 78. In which event the area of rear pressure surface 56B and the area of front pressure surface 55B will be equal and opposite. Therefore the force of the fluid pressure acting on rear pressure surface 56B will be equal to the area of surface 56B times the force of the fluid pressure. To this force will be added the force produced by the area of lower rear pressure surface 56C times the force of the fluid pressure in passageway A2. It is contemplated the fluid in passageway A2 will be a very low pressure. The sum of these two pressures will force pressure responsive sealing ring 50B in a direction for sealing face 54B to engage mating face 28B. This force will be opposed by the force which is the result of a fluid pressure drop between points E and F. That is the pressure at point E is added to the pressure at point F and that sum is divided in half and is multiplied by the area of front pressure surface 55B. The narrower passageway C the greater the difference in pressure between points E and F. The force acting on surface 55B is added to the force acting upon sealing face 54B which is the result of the force acting at point H added to the force acting at point I and divided in half and multiplied by the area of sealing face 54B. To that sum is added the force derived by multiplying the area of surface 55C times the force of the fluid pressure. In this manner a force is provided acting to force sealing face 54B away from mating face 28B. Thus a very slight clearance is provided between sealing face 54B and mating face 28B. If necessary sealing face 54B may be increased or decreased in area so as to be greater than or less than the area of rear pressure surface 56B. It is contemplated that the clearance mentioned will be equal to a film of oil. As the fluid in droplets passes point I it will have lost all significant pressure and flow through axial passageway 21D to counterbore 21E where it will be gathered.

FIG. 5 is a modified form of construction shown in FIG. 4 and provides for the knife edge 80A, circular recess 76A and O ring 81A to be located in sealing ring 50C instead of being located in flange 21Z as shown in FIG. 4. Disk 25C in FIG. 5 has a tapered shape but it functions in all respects in the same manner as disk 25A in FIG. 4.

FIG. 6 illustrates another modified form of construction. Housing 10, consisting of medial area 10A, having a hollow interior, generally indicated by reference numeral 11, is provided with an internal surface 35D. A flange 21Y provided with an external shoulder 90, an axial passageway 91, a counterbore 92 and a circular packing groove 93 is fastened to medial area 10A by means of bolts 22D with external shoulder 90 engaging internal surface 35D. A packing 94 in circular packing groove 93 forms a fluid tight connection between medial area 10A and flange 21Y.

A shaft 18D rotatively mounted in medial area 10A is provided with a threaded area 95 and a shoulder 96. A disk 25D provided with a mating face 28D and a circular recess 97 is fastened to shaft 18D with a drive fit and it abuts shoulder 96. A packing 98 in circular recess 97 provides a fluid tight seal between shaft 18D and disk 25D. A collar 26D is located upon shaft 18D and is held in position against disk 25D by thrust nut 31D rotatively mounted upon threaded area 95.

Pressure responsive sealing ring 50D consists of a circular outer surface 52D, an upper rear pressure surface 56D, a lower rear pressure surface 56E, an inner surface 51D, an upper front pressure surface 55D, a lower front pressure surface 55E, a sealing face 54D and a circular projection 99. An expansible bellows 100 is fastened to circular projection 99 as by welding and to a circular ridge 101 forming part of flange 21Y, also by welding. Expansible bellows 100 resiliently urges sealing face 54D into engagement with mating face 28D.

In operation fluid under pressure flowing in the direction of the "in flow" arrow flows into cavity 60D. As previously described with reference to FIG. 4, passageway C is a restrictive passageway having a width of two hundred micro-inches (.0002) whereby a fluid pressure drop takes place between points E and F to provide a mean fluid force acting upon upper front pressure surface 55D resulting in a force equal to the mean fluid force times the area of upper front pressure surface 55D which urges sealing face 54D away from mating face 28D. There is a further pressure drop between points H and I which results in a force also tending to urge sealing face 54D away from mating face 28D. That force is the area of sealing face 54D multiplied by the mean pressure of the fluid pressure acting on sealing face 54D.

The effect of the fluid pressure upon circular outer surface 52D and inner surface 51D is negligible.

The force exerted by expansible bellows 100 is augmented by the force of the fluid multiplied by the area of upper rear pressure surface 56D.

The fluid located in compartment 61D has a very low force or pressure. However, whatever pressure it has may be multiplied by the area of lower rear pressure surface 56E to further add to the force exerted by expansible bellows 100. This force is opposed by the force of the fluid multiplied by the area of lower front pressure surface 55E.

The sum total of the forces tending to move the sealing face 54D away from mating face 28D should slightly exceed the sum total of the forces moving sealing face 54D toward mating face 28D to provide a droplet flow of fluid pass the couple of the sealing face 54D with the mating face 28D. At high fluid pressures the forces are great and therefore difficult to handle. The restrictive passageway provides a mean pressure or a lower pressure more readily controlled to produce the desired effect.

FIG. 7 is a variation of FIGS. 4 and 6. In place of the expansible bellows 100, in FIG. 6, a coil spring 100A is provided as an auxiliary yielding force, in FIG. 7, and the knife edge 80 and packing 77 located in flange 21Z in FIG. 4 are relocated in pressure responsive sealing ring 50E in FIG. 7 as knife edge 80A and packing 77A. A pin 102 fastened in flange 21X projects into an orifice 103 in pressure responsive sealing ring 50E to prevent rotation of sealing ring 50E. Passageways A and C may both be restrictive passageways or passageway C alone may be a restrictive passageway.

Pressure responsive sealing ring 50E will function in the same manner as pressure responsive sealing rings 50, 50A, 50B, 50C and 50D. That is the restrictive passageways A and C will produce a pressure drop across the respective faces of the sealing ring or if passageway A is unrestrictive, then only passageway C will produce a mean pressure force as the result of a pressure drop. Coil spring 100A yieldingly urges sealing ring 50E toward mating face 28E.

FIG. 8 illustrates a modified form of construction. Housing 10, consisting of medial unit 10A, having a hollow interior divided into a cavity 60F and a compartment 61F is provided with an abutment 33F and an internal surface 35F. A spacing disk 105 provided with an axial bore 106 and an outside surface 107 is located in cavity 60F with engaging internal surface 35F and with side 108 against abutment 33F. Axial bore 106 surrounds shaft 18F. A spacing collar 26F provided with an internal surface 110 engages internal surface 35F and abuts spacing disk 105. A flange 21W is provided with an external surface 21F, an axial passageway 102 and a packing recess 93F. A shaft 18F rotatively mounted in medial unit 10A is provided with a shoulder 96F. A disk 25F provided with a circular recess 97F is fastened to internal surface 35F with a drive fit and is wedged between flange 21W and spacing collar 26F. A fluid tight packing is located in circular recess 97F.

Pressure responsive sealing ring 50F consists of circular outer surface 111, an upper rear pressure surface 112, a lower rear pressure surface 113, an upper inner surface 114, a lower inner surface 115, an upper front pressure surface 116, a lower front pressure surface 117, a sealing face 54F, an upper shelf 118 and a lower shelf 120.

Upper inner surface 114 is provided with a knife edge 80F which slidingly engages shaft 18F and a packing recess housing O ring 121 which engages shaft 18F in fluid tight relationship.

Pressure responsive sealing ring 50F rotates with shaft 18F through drive pin 102F fixed in shaft 18F on one end and located in orifice 103F in sealing ring 50F on the other end. Fluid passageways "A" and "C" are restrictive passageways. All other spaces surrounding sealing ring 50F are unrestrictive. This form, a variation rather than a true modification illustrates a sealing ring 50F while, rotating with the rotating shaft functions exactly the same as pressure responsive sealing rings 50, 50A, 50B or 50C, namely, that the restrictive passageways cause a pressure drop which reduces the full force of the fluid pressure from acting on the respective surfaces when fluid is permitted to escape passed the sealing face 54F, thereby creating a dynamic sealing ring as contrasted to a prior art static sealing ring.

FIG. 9 is a variation in construction because it discloses passageway "C" as a restrictive passageway and passageway A as unrestrictive. It also shows that spacing collar 26F shown in FIG. 8 may be eliminated. The essence of the present invention namely, the restrictive passageway functions as previously described in relation to previous figures.

FIG. 10 illustrates a modified form of construction wherein both the sealing ring and mating surface constituting a fluid couple are pressure responsive in a dynamic, leakage control, fluid seal.

Housing 10 is provided with a hollow interior having a circular wall 34H, an abutment 33H, an internal surface 35H, a circular projection 36H, and inlet port "H," a packing groove 37H and a knife edge 40H.

A flange 21H provided with an external shoulder 21I, an outlet "O" and an axial bore 21J is fastened to housing 10 by means of bolts 22H with external shoulder 21I engaging internal surface 35H. A fluid tight packing 21K may be provided between flange 21H and housing 10.

A disk 25H provided with a front surface 125, an outside surface 126, a rear surface 127, an axial bore 128, a step 129, a packing groove 130, an inside surface 131, a wall 132, a circular groove 133 and a knife edge 134 is fastened to shaft 18H through threads 30H and step 129H.

A shaft 18H having a shoulder 96H and a thread 30H is rotatively mounted in housing 10. Fluid packing 135 in packing groove 130 provides a fluid tight seal between axial bore 128 and shaft 18H.

A mating ring 27H is provided with a mating face 28H, a circular inner surface 51H, outer surface 140, an upper back surface 141, a lower back surface 142 and a sliding surface 143. A fluid tight packing 133A located in circular groove 133 forms a fluid tight seal with sliding surface 143. Knife edge 134 engages sliding surface 143 to slidingly support mating ring 27H with a limited degree of sliding oscillatible motion.

The pressure responsive sealing ring 50H consists of a circular outer surface 52H, a rear pressure surface 56H, an upper rear pressure surface 59H, a lower front pressure surface 55H, an upper front pressure surface 102, a sealing face 54H and an axial surface 150. A fluid packing 151 in packing groove 37H forms a fluid tight seal with circular outer surface 52H. Knife edge 40H engages circular outer surface 52H to slidingly support pressure responsive sealing ring 50H with sliding oscillatible motion. Passageway C is a restrictive passageway. It is formed between lower front pressure surface 55H and mating surface 28H.

In operation, fluid under pressure will pass through port "H" to passageways A, B, B1 and A1. The fluid will be blocked by packings 151 and 133A to force the fluid through passageway "C." The fluid pressure in passageways "B" and "B1" acting upon axial surface 150 and inner surface 51H, respectively, will tend to horizontally align sealing ring 50H and mating ring 27H.

The force of the fluid pressure acting upon rear pressure surface 56H and lower back surface 142 will act to cause sealing face 54H to engage mating face 28H with a force equal to the sum of the areas of lower back surface 142 plus rear pressure surface 56H times the force of the fluid.

If passageway "C" is constructed to be a restricted passageway on the order of two hundred micro-inches (.0002) wide, then the force of the fluid acting upon front pressure surface 55H and mating face 28H will be equal to the area of front pressure surface 55H and the area of mating face 28H opposite front pressure surface 55H or twice the area of front pressure surface 55H times the mean pressure of the fluid. There is a pressure drop in passageway C between points E and F divided by two. The area of front pressure surface 55H must be varied so as to create an area sufficiently great that the mean force of the fluid pressure acting on twice the area of front pressure surface 55H will separate sealing face 54H from mating face 28H a distance sufficient to allow fluid to pass therebetween in droplet amounts. The force of the fluid passing between sealing face 54H and mating face 28H will be of a lower order than the force of the fluid at point "E." However, the force of the fluid multiplied by twice the area of sealing face 54H will produce a force tending to separate sealing face 54H from mating face 28H. The fluid flowing past point "I" into chamber 61H will be of a very low order so that the force of the fluid acting on surfaces 102, 59H and 141 are very small but they may be calculated and their influence added or subtracted from forces acting in the respective, same direction.

The fluid in compartment 61H may flow through port "O" to escape compartment 61H.

FIG. 11 is a modified form of fluid seal wherein housing unit 10 comprises medial unit 10A, end plate 5L fastened to medial unit 10A by means of bolts 4L and flange 21L fastened to medial unit 10A by means of bolts 22L to form a chamber, generally indicated by reference 11L.

A shaft 18L is rotatively mounted in flange 21L with a fluid tight packing 175 between shaft 18L and flange 21L. A mating ring 27L having a mating face 28L is fastened to shaft 18L by any means, but illustrated as by means of bolt 176.

An expansible bellows 177 is fastened to end plate 5L as by welding. A sealing ring 50L consisting of a back pressure surface 178, a front pressure surface 179, an outer surface 180, an inner surface 181, a sealing face 54L and a circular ledge 182. Expansible bellows 177 is fastened to back pressure surface 178, as by welding. Expansible bellows 177 yieldingly urges sealing face 54L into engagement with mating face 28L to divide chamber 11L into a high pressure fluid cavity 60L and a low pressure fluid compartment 61L. A fluid entrance port 183 is provided in end plate 5L for communication with high pressure fluid cavity 60L. An exit port 184 is provided in medial unit 10A for communication with low pressure fluid compartment 61L. A fluid packing 185 may be provided between end plate 5L and medial unit 10A. A second fluid packing 186 may be provided between flange 21L and medial unit 10A.

In operation, fluid under pressure enters through port 183 to fluid cavity 60L with fluid under pressure utilizing between 1000 p.s.i. to 10,000 p.s.i. (pounds per square inch). Expansible bellows 177 will be exerting force upon sealing face 54L in its engagement with mating face 28L. To this force will be subtracted the difference between the product of the area of rear pressure surface 178 multiplied by the p.s.i., of the force of the fluid pressure and the product of the p.s.i. of the force of the mean force of the fluid pressure multiplied by the area of the front pressure surface 179 added to the product of the mean force of the fluid pressure multiplied by the area of the sealing face 54L.

The mean force of the fluid pressure is determined by adding the p.s.i. at point "E" to the p.s.i. at point "F" and dividing by two.

The result contemplated is a net force which will hold sealing face 54L away from mating face 28L whereby fluid in droplets will pass therebetween. The droplets will accumulate in compartment 61L and pass through exit port 184.

Sealing face 54L may be varied in width to change the area of front pressure surface 179. Sealing face 54L may be relocated in relation to front pressure surface 179 to increase or decrease the area of front pressure surface 179.

Having shown and described the preferred embodiments of the present invention by way of example, it should be realized that structural changes could be made and other examples given without departing from either the spirit or scope of this invention.

What I claim is:

1. A dynamic pressure seal comprising in combination a housing provided with a chamber having an abutment, a shaft mounted in said housing, a mating ring provided with a mating face, means securing said mating ring to said shaft in fluid tight relationship, a sealing ring, provided with a rear pressure surface, and a front pressure surface having a sealing face, disposed between said abutment and said mating face for axial movement therebetween, fluid sealing means and support means between said housing and said sealing ring, dividing said chamber into two sections, a cavity and a compartment, inlet port means in said housing communicating with said cavity, outlet port means in said housing communicating with said compartment, an unrestricted passageway between said rear pressure surface and said abutment communicating with said inlet port means, an unrestricted passageway between said shaft and said sealing ring, and a restricted passageway between said mating face and said front pressure surface, whereby fluid under pressure in said cavity passes through said first mentioned unrestricted passageway, to and through said second mentioned unrestricted passageway to said restricted passageway, the fluid pressure creating an axial thrust upon said sealing ring, equal to the area of said rear pressure surface times the fluid pressure, to thrust said sealing face into engagement with said mating face, and a counter force opposing said thrust being equal to the area of said front pressure surface multiplied by the mean fluid pressure acting on said front pressure surface, the mean fluid pressure being created by a pressure drop in the fluid pressure as the fluid passes from said second unrestricted passageway to said sealing face, the opposing fluid pressure moving said sealing face away from said mating face a distance to permit fluid to pass therebetween and thereby create a dynamic pressure seal.

2. A dynamic pressure seal which comprises in combination a housing having a chamber, a shaft rotatable in said housing, a mating ring having a mating face located within said chamber, means fastening said mating ring to said shaft, a sealing ring located within said chamber, means supporting said sealing ring in said housing for relative axial movement of the sealing ring, said sealing ring having an annular sealing face disposed to engage said mating face, the length of said sealing ring and sealing face being such when compared to the space between the mating face and housing that in a restricted passageway formed between the end of the sealing ring and mating face and the greater restricted passageway formed between the sealing face and mating face a fluid leakage occurs and the fluid pressure undergoes a pressure drop, the effective areas under fluid pressure on opposite ends of the sealing ring being such that the areas are relatively variable through the width of the sealing face so that there shall be a pressure difference forcing the sealing face toward the mating face but not sufficient to prevent controlled leakage therebetween.

References Cited

UNITED STATES PATENTS

| 2,087,313 | 7/1937 | Bigelow et al. | 277—27 |
| 2,221,225 | 11/1940 | Weis et al. | 277—3 X |
| 2,814,512 | 11/1957 | Quinn et al. | 277—27 X |
| 2,907,594 | 10/1959 | Macks | 277—74 X |
| 2,967,487 | 1/1961 | Nagely | 103—126 |
| 2,984,507 | 5/1961 | Welch | 277—27 |
| 3,075,778 | 1/1963 | Bowers et al. | 277—27 X |
| 3,156,191 | 11/1964 | Lauck | 277—63 X |

SAMUEL ROTHBERG, Primary Examiner

U.S. Cl. X.R.

277—73, 74